(12) United States Patent
Viswanathan et al.

(10) Patent No.: US 11,016,852 B1
(45) Date of Patent: May 25, 2021

(54) GUARDED MODE BOOT UP AND/OR RECOVERY OF A NETWORK DEVICE

(71) Applicant: Juniper Networks, Inc., Sunnyvale, CA (US)

(72) Inventors: Sundareswaram Pallanchathanoor Viswanathan, Bangalore (IN); Deepti Nirmalkumarji Rathi, Bangalore (IN); Karthick Krishnakumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 501 days.

(21) Appl. No.: 15/591,812

(22) Filed: May 10, 2017

(51) Int. Cl.
*G06F 11/14* (2006.01)
*H04W 12/63* (2021.01)
*H04L 29/06* (2006.01)
*G06F 9/4401* (2018.01)

(52) U.S. Cl.
CPC ........ *G06F 11/1417* (2013.01); *G06F 9/4401* (2013.01); *G06F 9/4416* (2013.01); *G06F 11/142* (2013.01); *H04W 12/63* (2021.01); *G06F 2201/805* (2013.01); *H04L 63/107* (2013.01)

(58) Field of Classification Search
CPC .. G06F 11/1417; G06F 9/4401; G06F 21/575; G06F 21/73; G06F 21/572; G06F 2221/2111; G06F 11/142; G06F 2201/805; H04W 12/1206; G08B 13/00
See application file for complete search history.

(56) References Cited

U.S. PATENT DOCUMENTS

| | | | | |
|---|---|---|---|---|
| 6,244,758 | B1 * | 6/2001 | Solymar | 395/200.54 |
| 8,239,688 | B2 * | 8/2012 | De Atley et al. | G06F 21/51 713/189 |
| 8,326,268 | B2 * | 12/2012 | Ahn | H04W 12/12 455/411 |
| 8,769,639 | B2 * | 7/2014 | Begorre | H04L 63/1466 726/5 |
| 8,913,959 | B1 * | 12/2014 | Pochop, Jr. | 455/41.2 |
| 8,942,721 | B1 * | 1/2015 | Aragon | H04W 24/00 |

(Continued)

OTHER PUBLICATIONS

Microsoft, "Secure Boot Overview", https://technet.microsoft.com/en-us/library/hh824987.aspx, May 5, 2017, 4 pages.

(Continued)

*Primary Examiner* — Madhuri R Herzog
(74) *Attorney, Agent, or Firm* — Harrity & Harrity, LLP

(57) ABSTRACT

A device may determine a boot up identifier for the device using information related to a deployment of the device. The boot up identifier may identify the deployment of the device. The device may perform a comparison of the boot up identifier and a provisioned identifier to determine whether the deployment of the device and an intended deployment of the device match. The provisioned identifier may identify the intended deployment of the device. The device may perform a boot up of the device in a particular mode of operation based on a result of the comparison. The comparison may indicate whether the deployment of the device and the intended deployment of the device match. The particular mode of operation may cause the device to boot up to recover or reconfigure the device.

20 Claims, 6 Drawing Sheets

(56) References Cited

U.S. PATENT DOCUMENTS

| | | | | |
|---|---|---|---|---|
| 9,195,831 B1* | 11/2015 | Condra et al. | .......... | G06F 21/57 |
| | | | | 713/187 |
| 9,197,651 B2* | 11/2015 | Gordon | ................ | G06F 21/552 |
| | | | | 726/3 |
| 9,467,845 B1* | 10/2016 | Rastogi | ................... | H04W 4/80 |
| 2009/0328131 A1* | 12/2009 | Chaturvedi et al. | .... | G06F 12/16 |
| | | | | 726/19 |
| 2013/0007249 A1* | 1/2013 | Wang | ..................... | G06F 15/161 |
| | | | | 709/223 |
| 2013/0210404 A1* | 8/2013 | Curtis | ..................... | H04L 67/34 |
| | | | | 455/418 |
| 2014/0325644 A1* | 10/2014 | Oberg et al. | ............ | G06F 21/51 |
| | | | | 726/22 |
| 2014/0373184 A1* | 12/2014 | Mahaffey | ................ | G06F 21/88 |
| | | | | 726/35 |
| 2015/0156309 A1* | 6/2015 | Gruberman | ........ | G06Q 30/0201 |
| | | | | 455/414.3 |
| 2015/0200934 A1* | 7/2015 | Naguib | ............... | H04L 63/0853 |
| 2016/0357994 A1* | 12/2016 | Kanakarajan | ..... | H04W 12/1206 |
| 2016/0364570 A1* | 12/2016 | Stern | ..................... | G06F 21/575 |
| 2017/0185418 A1* | 6/2017 | Huang | ................... | G06F 8/654 |
| 2018/0217846 A1* | 8/2018 | Lagnado | ............... | G06F 9/4416 |

OTHER PUBLICATIONS

Wikipedia, "Safe mode", https://en.wikipedia.org/wiki/Safe_mode, Apr. 27, 2017, 3 pages.
Wikipedia, "Network Access Control", https://en.wikipedia.org/wiki/Network_Access_Control, Jan. 12, 2017, 3 pages.
Wikipedia, "Network Access Protection", https://en.wikipedia.org/wiki/Network_Access_Protection, Jul. 15, 2016, 3 pages.

* cited by examiner

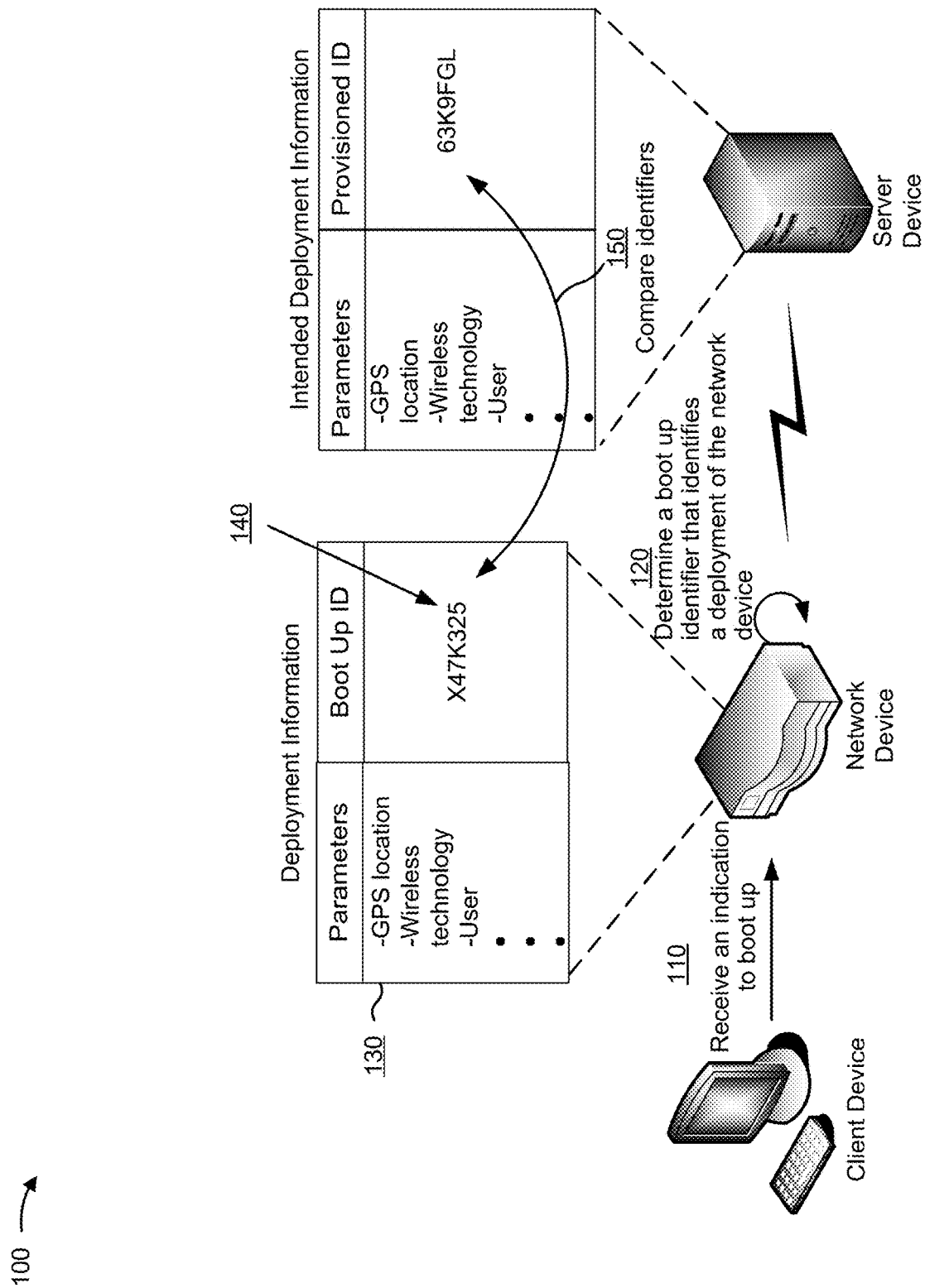

GUARDED MODE BOOT UP AND/OR RECOVERY OF A NETWORK DEVICE

BACKGROUND

Safe mode may include a diagnostic mode of a computer operating system. Safe mode may additionally include a mode of operation of an application and/or software. Safe mode may be used to facilitate fixing of errors related to an operating system. In addition, safe mode may be used for removing rogue security software. Safe mode may include using an operating system with reduced functionality so as to more easily isolate problems as some non-core components of the operating system are disabled.

SUMMARY

According to some possible implementations, a device may comprise one or more processors to receive an indication to boot up. The one or more processors may determine a first identifier for the device using information related to a deployment of the device. The first identifier may identify the deployment of the device. The one or more processors may perform a comparison of the first identifier and a second identifier to determine whether the deployment of the device matches a particular deployment associated with the device. The second identifier may identify the particular deployment associated with the device. The one or more processors may determine whether to boot up the device in a particular mode of operation based on a result of the comparison. The particular mode of operation may permit reconfiguration or recovery of the device. The one or more processors may perform an action based on determining whether to boot up the device in the particular mode of operation.

According to some possible implementations, a non-transitory computer-readable medium may store one or more instructions that, when executed by one or more processors, cause the one or more processors to receive an indication to boot up. The one or more instructions, when executed by the one or more processors, may cause the one or more processors to determine a first set of parameters that define a first deployment for a device. The one or more instructions, when executed by the one or more processors, may cause the one or more processors to determine a first identifier for the device using information related to the first deployment of the device after receiving the indication to boot up. The first identifier may identify the first deployment of the device. The information may identify a first set of values for the first set of parameters that define the first deployment. The one or more instructions, when executed by the one or more processors, may cause the one or more processors to perform a comparison of the first identifier and a second identifier to determine whether the first deployment of the device and a second deployment associated with the device match. The second identifier may identify the second deployment associated with the device. The second identifier may be based on a second set of values for a second set of parameters that define the second deployment. The one or more instructions, when executed by the one or more processors, may cause the one or more processors to determine whether to boot up the device in a mode of operation based on a result of the comparison. The mode of operation may permit reconfiguration or recovery of the device. The one or more instructions, when executed by the one or more processors, may cause the one or more processors to perform an action based on determining whether to boot up the device in the mode of operation.

According to some possible implementations, a method may comprise determining, by a device, a boot up identifier for the device using information related to a deployment of the device. The boot up identifier may identify the deployment of the device. The method may comprise performing, by the device, a comparison of the boot up identifier and a provisioned identifier to determine whether the deployment of the device and an intended deployment of the device match. The provisioned identifier may identify the intended deployment of the device. The method may comprise performing, by the device, a boot up of the device in a particular mode of operation based on a result of the comparison. The comparison may indicate whether the deployment of the device and the intended deployment of the device match. The particular mode of operation may cause the device to boot up to recover or reconfigure the device.

BRIEF DESCRIPTION OF THE DRAWINGS

FIGS. 1A and 1B are diagrams of an overview of an example implementation described herein;

DETAILED DESCRIPTION

The following detailed description of example implementations refers to the accompanying drawings. The same reference numbers in different drawings may identify the same or similar elements.

A network device may be subject to physical threats, such as theft, when deployed in an outdoor environment. In addition, an individual may tamper with a configuration of a network device to cause the network device to operate in an unpermitted or unintended manner. Further, a network device may experience an error during boot up that alters a configuration of the network device. The network device may lack a technique that permits the network device to identify one of the previously described issues, permits recovery of the network device (e.g., physical and/or technical), permits reconfiguration of the network device in accordance with an intended deployment, and/or the like when the network device is stolen, has experienced tampering, and/or has experienced an error.

Some implementations, described herein, provide a network device that is capable of receiving an indication to boot up, determining a boot up identifier that identifies a deployment of the network device, performing a comparison of the boot up identifier and a provisioned identifier that identifies an intended deployment of the network device, determining whether to boot up the network device in a particular mode of operation (e.g., a guarded mode) that permits reconfiguration and/or recovery of the network device based on a result of the comparison, and/or performing an action based on determining whether to boot up the network device in the particular mode of operation.

In this way, a network device may quickly and accurately determine whether a network device has been configured to operate in an unpermitted manner, physically moved to an unpermitted location, and/or removed from a network (or moved to another network), and/or the like. In addition, the network device may facilitate physical and/or technical recovery of the network device. This increases technical security of the network device, thereby increasing operational integrity of the network device. In addition, this increases physical security of the network device, thereby reducing or eliminating physical loss associated with the network device. Further, this improves network operation and/or conserves network resources by ensuring that the network device operates as intended (e.g., a tampered network device may consume more bandwidth than intended, an administrator error may result in duplicate Internet protocol (IP) addresses, thereby causing network errors, etc.).

Figure 1B:
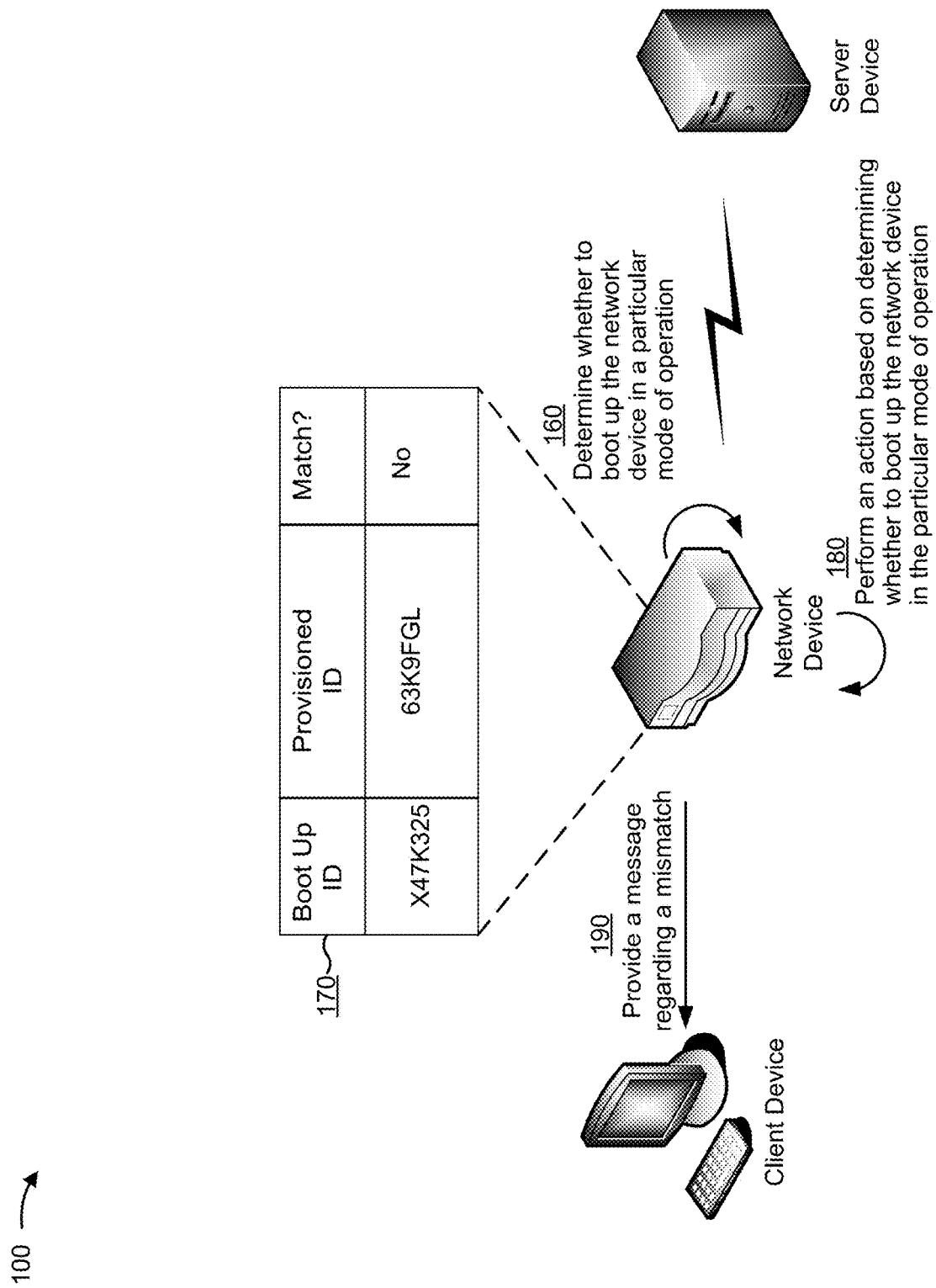

FIGS. 1A and 1B are diagrams of an overview of an example implementation 100 described herein. As shown in FIG. 1A, example implementation 100 may include a client device, a network device, and/or a server device.

As shown in FIG. 1A, and by reference number 110, the network device may receive an indication to boot up. For example, the network device may receive a set of instructions that cause the network device to boot up. As shown by reference number 120, the network device may determine a boot up identifier (ID) that identifies a deployment of the network device. For example, as shown by reference number 130, the deployment of the network device may be defined by a set of parameters, such as a parameter relating to a global positioning system (GPS) location of the network device (e.g., a physical location), a parameter relating to a wireless technology which the network device is configured to use, a parameter relating to a user or user profile associated with the network device, and/or the like. In this way, the network device may determine a deployment based on a variety parameters.

As show by reference number 140, and for example, the network device may determine an alphanumeric boot up identifier that identifies the deployment of the network device. For example, the boot up identifier may identify the set of parameters that define the deployment of the network device.

As shown by reference number 150, the network device may compare the boot up identifier and a provisioned identifier (e.g., stored by the server device in an encrypted record). The provisioned identifier may identify an intended deployment of the network device (e.g., a set of parameters that define the intended deployment, such as an intended GPS location, software for which the network device is licensed to use, etc.). Performing the comparison may permit the network device to determine whether the device has experienced tampering, has been configured to operate in an unpermitted manner, has been moved to an unpermitted location, has experienced an error during boot up, and/or the like.

As shown in FIG. 1B, and by reference number 160, the network device may determine whether to boot up the network device in a particular mode of operation based on a result of the comparison. For example, the network device may determine whether to boot up in a mode of operation that permits recovery of the network device, reconfiguration of the network device according to an intended deployment of the network device, and/or the like. For example, as shown by reference number 170, the network device may determine that a result of the comparison indicates that the boot up identifier and the provisioned identifier do not match, thereby indicating that the network device is to boot up in the particular mode of operation.

As shown by reference number 180, the network device may perform an action based on determining whether to boot up the network device in the particular mode of operation. For example, the network device may boot up in the particular mode of operation. Additionally, or alternatively, and as another example, and as shown by reference number 190, the network device may send a message identifying a result of the comparison to the client device, send a message that includes information identifying the deployment of the network device to the client device, and/or the like.

In this way, a network device may quickly and accurately determine whether the network device has been configured to operate in an unpermitted manner and/or physically moved to an unpermitted location. In addition, the network device may facilitate physical and/or technical recovery of the network device. This increases technical security of the network device, thereby increasing operational integrity of the network device. In addition, this increases physical security of the network device, thereby reducing or eliminating physical loss associated with the network device.

As indicated above, FIGS. 1A and 1B are provided merely as an example. Other examples are possible and may differ from what was described with regard to FIGS. 1A and 1B. For example, although implementations were described in the context of a network device, the implementations apply equally to other types of devices, such as a client device and/or a server device.

Figure 2:
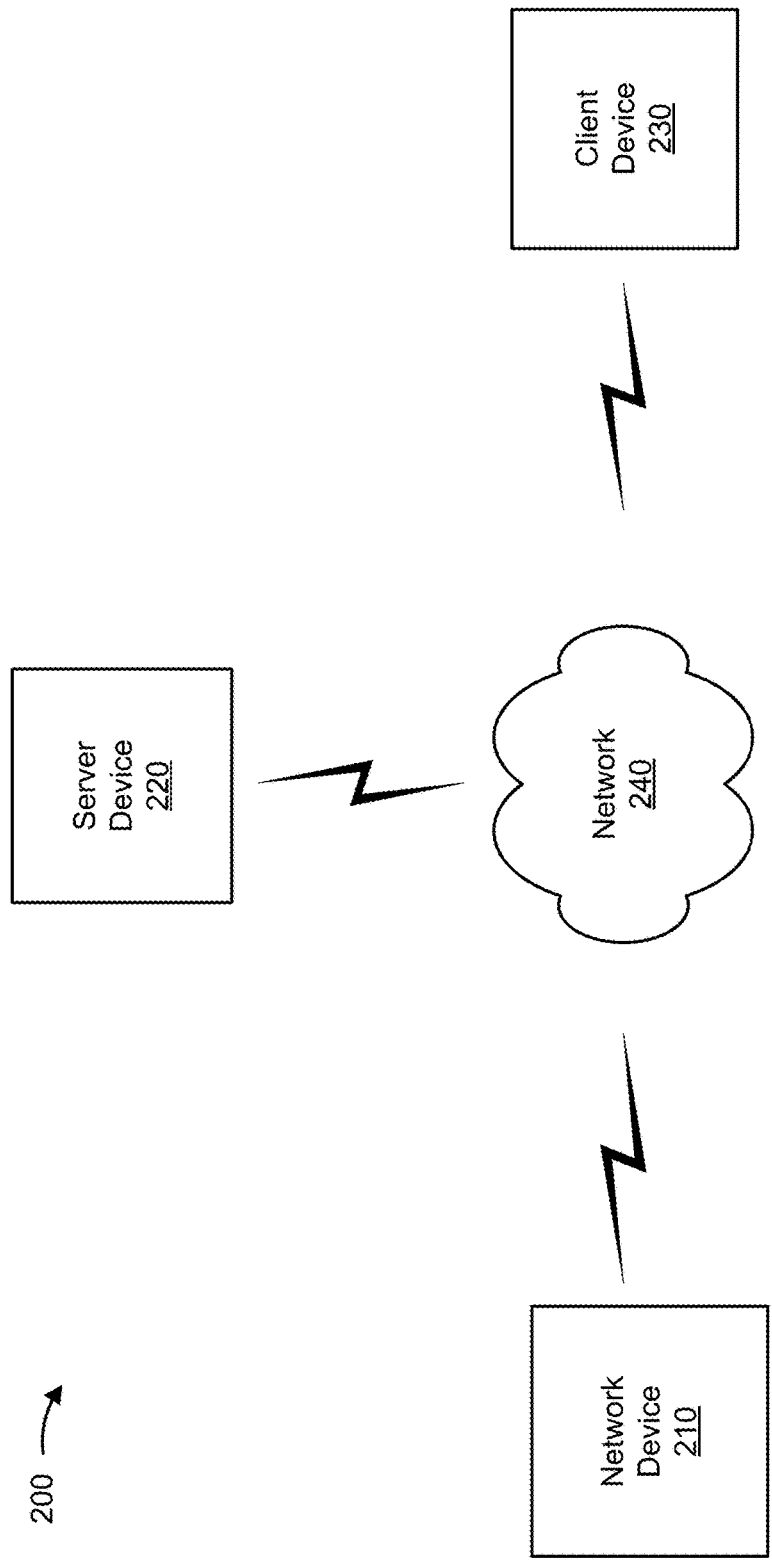
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include network device 210, server device 220, client device 230, and/or network 240. Devices of environment 200 may interconnect via wired connections, wireless connections, or a combination of wired and wireless connections.

Network device 210 includes one or more devices (e.g., one or more traffic transfer devices) capable of receiving, generating, storing, processing, and/or providing information related to guarded mode boot up and/or recovery of network device 210. For example, network device 210 may include a modem, a firewall, a router, a gateway, a switch, a hub, a bridge, a reverse proxy, a server (e.g., a proxy server), a security device, an intrusion detection device, a load balancer, or a similar type of device. In some implementations, network device 210 may be a physical device implemented within a housing, such as a chassis. In implementations, network device 210 may be a virtual device implemented by one or more computer devices of a cloud computing environment or a data center. In some implementations, network device 210 may determine a boot up identifier that identifies a deployment of network device 210, as described elsewhere herein. Additionally, or alternatively, network device 210 may boot up in a particular mode of operation based on the boot up identifier and/or may perform an action to facilitate recovery of network device 210, as described elsewhere herein.

Server device 220 includes one or more devices capable of receiving, generating, storing, processing and/or providing information associated with guarded mode boot up and/or recovery of network device 210. For example, server device 220 may include a server (e.g., a web server, a server in a multi-server data center, or the like), a data center (e.g., a multi-server micro data center), a workstation computer, a virtual machine (VM) provided in a cloud computing environment, or a similar type of device. In some implementations, server device 220 may store a provisioned identifier that identifies an intended deployment of network device 210, as described elsewhere herein. Additionally, or alternatively, server device 220 may provide the provisioned identifier to network device 210 for comparison with a boot up identifier, as described elsewhere herein.

Client device 230 includes one or more devices capable of receiving, generating, storing, processing, and/or providing information associated with guarded mode boot up and/or recovery of network device 210. For example, client device 230 may include a mobile phone (e.g., a smart phone or a radiotelephone), a desktop computer, a laptop computer, a tablet computer, a gaming device, a wearable communication device (e.g., a smart wristwatch or a pair of smart eyeglasses), or a similar type of device. In some implementations, client device 230 may receive information related to a deployment of network device 210, as described elsewhere herein. Additionally, or alternatively, client device 230 may perform an action to recover network device 210 and/or to facilitate fixing of an error related to network device 210, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
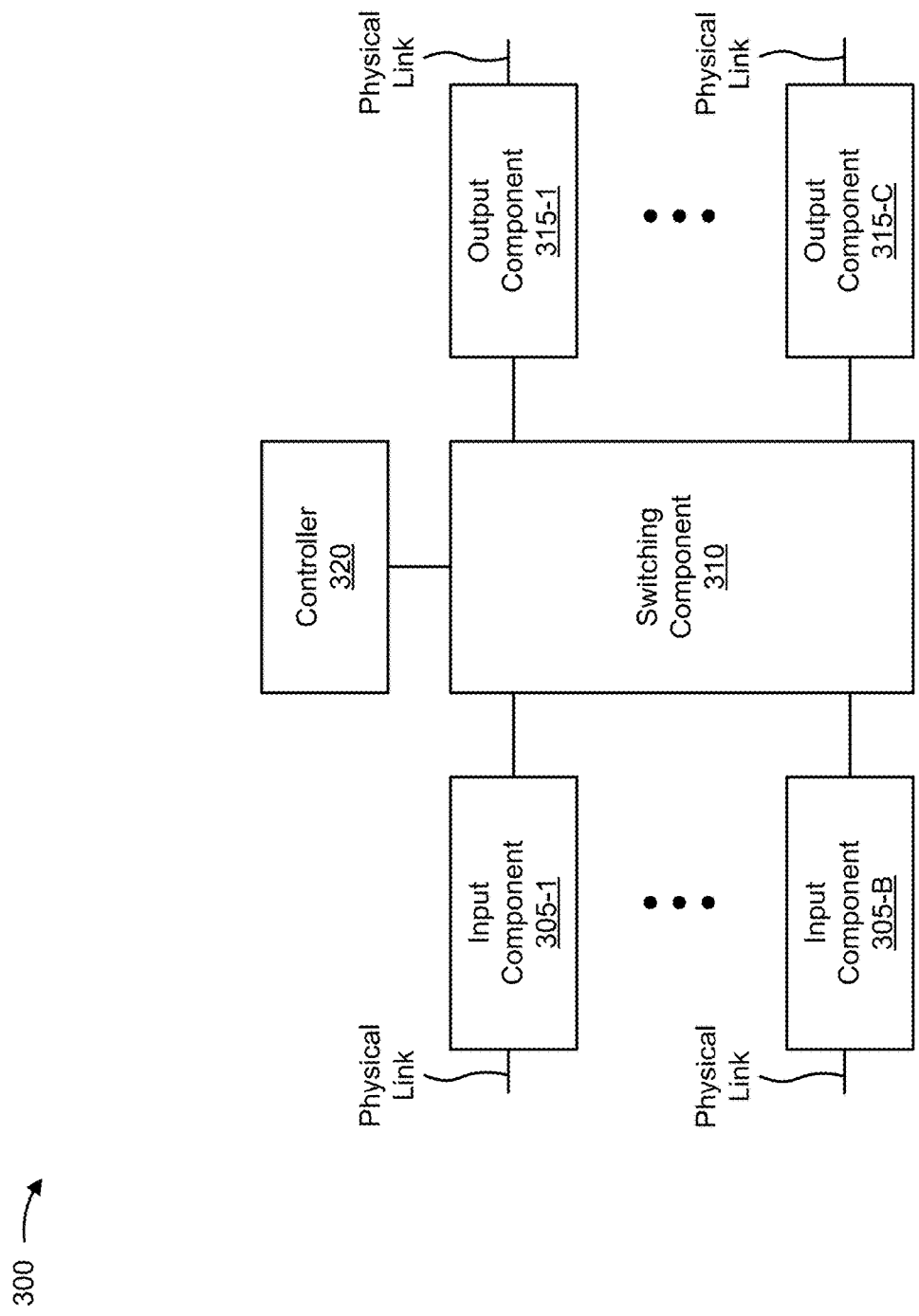
FIG. 3 is a diagram of example components of one or more devices of FIG. 2.

FIG. 3 is a diagram of example components of a device 300. Device 300 may correspond to network device 210, server device 220, and/or client device 230. In some implementations, network device 210, server device 220, and/or client device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
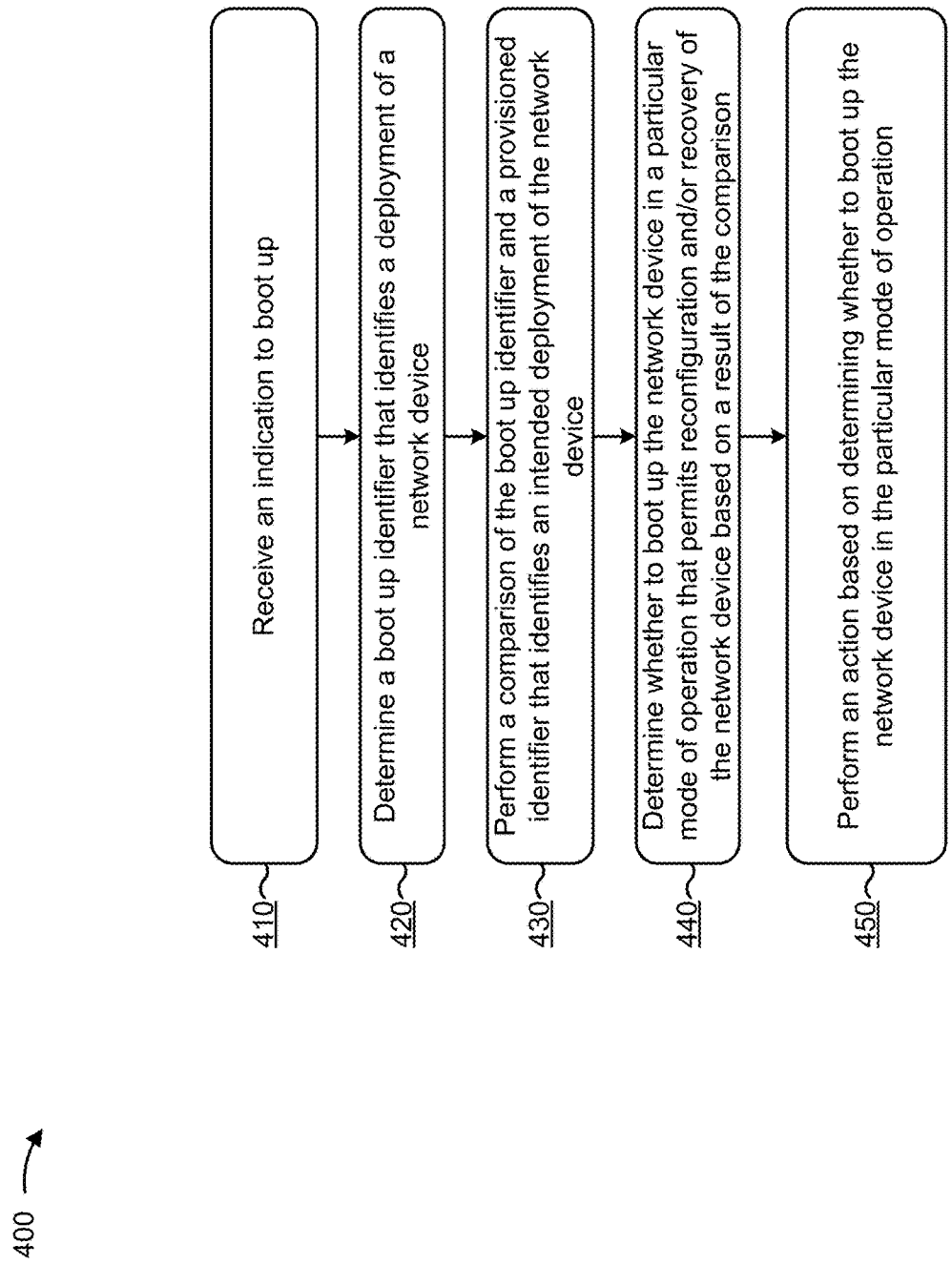
FIG. 4 is a flow chart of an example process for guarded mode boot up and/or recovery of a network device.

FIG. 4 is a flow chart of an example process 400 for guarded mode boot up and/or recovery of a network device. In some implementations, one or more process blocks of FIG. 4 may be performed by network device 210. In some implementations, one or more process blocks of FIG. 4 may be performed by another device or a group of devices separate from or including network device 210, such as server device 220 and/or client device 230.

As shown in FIG. 4, process 400 may include receiving an indication to boot up (block 410). For example, network device 210 may receive the indication to boot up. In some implementations, network device 210 may receive the indication periodically, according to a schedule, based on input from a user of network device 210, based on a network administrator pressing a power button, based on receiving a set of instructions from another device (e.g., server device 220 and/or client device 230), and/or the like. Network device 210 may boot up (e.g., load a kernel, load an application, load an operating system, etc.) after receiving the indication. In this way, network device 210 may receive an indication to boot up.

As further shown in FIG. 4, process 400 may include determining a boot up identifier that identifies a deployment of a network device (block 420). For example, network device 210 may determine a boot up identifier that identifies a deployment of network device 210. In some implementations, network device 210 may determine the boot up identifier during boot up, after network device 210 powers on and/or loads a kernel of network device 210, based on receiving a set of instructions to determine the boot up identifier, and/or the like.

In some implementations, a deployment may relate to a manner in which network device 210 is configured to operate. In some implementations, a deployment may be defined by a set of parameters related to the manner in which network device 210 is configured to operate. For example, the set of parameters may identify a geolocation of network device 210 (e.g., as determined using a global positioning system (GPS) component), an address (e.g., of a building) at which network device 210 is installed, a rack shelf identifier that identifies a slot or a shelf of a rack on which network device 210 is installed, an Internet protocol (IP) address of network device 210, and/or the like.

Additionally, or alternatively, as additional examples, the set of parameters may identify a mode of operation of network device 210, such as a wireless technology (e.g., Wi-Fi, worldwide interoperability for microwave access (WiMAX), or LTE) and/or wireless spectrum (e.g., quadrature phase shift keying (QPSK), quadrature amplitude modulation (QAM) 16, or QAM 8) that network device 210 is configured to use, and/or a type of device that network device 210 is configured to operate as (e.g., modem, router, switch, gateway, etc. when network device 210 can be configured to operate as different types of devices), and/or the like.

Additionally, or alternatively, and as additional examples, the set of parameters may identify a management network 240 with which network device 210 is associated, a user (or user profile) and/or administrator (or administrator profile) with which network device 210 is associated, software and/or applications installed on network device 210, and/or the like. In some implementations, a parameter that defines a deployment may be identified by a parameter identifier.

In some implementations, network device 210 may determine the deployment during boot up by checking a configuration of network device 210, a GPS coordinate of network device 210, and/or the like (e.g., by identifying a set of parameter identifiers that define the deployment). In some implementations, network device 210 may determine the boot up identifier using the set of parameter identifiers that define the deployment. For example, network device 210 may combine the set of parameter identifiers to form a single identifier (e.g., a boot up identifier) that identifies the deployment of network device 210. Additionally, or alternatively, and as another example, network device 210 may use a hash function, or another algorithm, to process the set of parameter identifiers, or other information identifying the set of parameters, to generate a boot up identifier.

In some implementations, a boot up identifier may represent the current deployment of network device 210 (e.g., the deployment of network device 210 during the current boot up). The use of a boot up identifier permits quick and efficient analysis of a deployment of network device 210, thereby conserving processing resources related to analyzing the deployment of network device 210.

In this way, network device 210 may determine a boot up identifier that identifies a deployment of network device 210.

As further shown in FIG. 4, process 400 may include performing a comparison of the boot up identifier and a provisioned identifier that identifies an intended deployment of the network device (block 430). For example, network device 210 may perform the comparison of the boot up identifier and a provisioned identifier that identifies an intended deployment of network device 210, such as to determine whether the deployment of network device 210 and an intended deployment of network device 210 match. Additionally, or alternatively, and as another example, network device 210 may provide the boot up identifier to server device 220 and/or client device 230 to permit server device 220 and/or client device 230 to perform the comparison. This conserves processing resources of network device 210 via outsourcing performance of the comparison to server device 220 and/or client device 230.

In some implementations, a provisioned identifier may identify an intended deployment of network device 210. For example, the provisioned identifier may identify a factory configuration of network device 210, a configuration of network device 210 for which network device 210 is licensed, an initial installation location of network device 210 (e.g., a GPS location), and/or the like. In some implementations, the provisioned identifier may be based on a set of parameters that define the intended deployment (e.g., based on a set of parameter identifiers), similar to that described with respect to the boot up identifier.

In some implementations, network device 210 may determine a provisioned identifier. For example, network device 210 may determine the provisioned identifier the first time network device 210 boots up, using information from server device 220 and/or client device 230 related to an intended deployment of network device 210, and/or the like (e.g., prior to deployment of network device 210). Additionally, or alternatively, a network administrator may use server device 220 and/or client device 230 to determine a provisioned identifier (e.g., prior to deploying network device 210).

In some implementations, network device 210 may store the provisioned identifier (e.g., using memory resources of network device 210, such as flash memory). Additionally, or alternatively, server device 220 and/or client device 230 may store the provisioned identifier. This may increase security of a provisioned identifier relative to storing the provisioned identifier locally on network device 210. In some implementations, a provisioned identifier may be stored using an encryption technique. For example, network device 210, server device 220, and/or client device 230 may store the provisioned identifier using a message digest 5 (MD5) algorithm, a secure hash algorithm (SHA), such as SHA 1 or SHA 224, and/or the like. This increases security related to storing a provisioned identifier and increases reliability of a comparison using the provisioned identifier, relative to storing the provisioned identifier without using an encryption technique.

In some implementations, when performing a comparison of a boot up identifier and a provisioned identifier, network device 210 may determine whether the boot up identifier and the provisioned identifier match. For example, network device 210 may determine whether a value of the boot up identifier and a value of the provisioned identifier match. In this way, network device 210 may quickly and efficiently determine whether a deployment of network device 210 matches an intended deployment of network device 210.

Additionally, or alternatively, and as another example, network device 210 may determine whether a difference between a value for the boot up identifier and a value for the provisioned identifier satisfies a threshold, or whether a difference between values for particular parameter identifiers satisfies a threshold. Continuing with the pervious example, network device 210 may determine that the difference between a GPS location of network device 210 and an intended GPS location of network device 210 satisfies a threshold, that a difference between a software version of network device 210 and an intended software version of network device 210 satisfies a threshold, and/or the like.

In this way, network device 210 may permit a threshold amount of variation between a deployment of network device 210 and an intended deployment of network device 210, such as to account for threshold movement of network device 210 (e.g., to a different portion of a building or corporate campus), routine software updates, and/or the like. This improves performance of network device 210 by preventing network device 210 from erroneously booting up in a particular mode of operation (e.g., a guarded mode) based on threshold variations in a deployment of network device 210. In addition, this conserves processing resources of network device 210, server device 220, and/or client device 230 by reducing or eliminating a need for network device 210, server device 220, and/or client device 230 to determine a new provisioned identifier for threshold variations in a deployment of network device 210, and/or by reducing or eliminating a quantity of times that network device 210, server device 220, and/or client device 230 have to perform an action to recover network device 210 from boot up in the particular mode of operation.

In this way, network device 210 may perform a comparison of the boot up identifier and a provisioned identifier that identifies an intended deployment of network device 210.

As further shown in FIG. 4, process 400 may include determining whether to boot up the network device in a particular mode of operation that permits reconfiguration and/or recovery of the network device based on a result of the comparison (block 440). For example, network device 210 may determine whether to boot up network device 210 in a particular mode of operation (e.g., a guarded mode) based on a result of the comparison. In some implementations, a result of the comparison may indicate whether a boot up identifier and a provisioned identifier match.

In some implementations, a particular mode of operation may include a mode of operation, such as a guarded mode, that permits recovery of network device 210 (e.g., physical or technical recovery), permits reconfiguration of network device 210 so as to match an intended deployment of network device 210, restricts access to network device 210 to a particular type of access (e.g., to administrator access, access via a console of network device 210, access via secure shell (SSH), root access, access via a management network 240, etc.), and/or the like, as described in more detail elsewhere herein. Additionally, or alternatively, the particular mode of operation may include secure boot, safe boot, safe mode, and/or the like. The particular mode of operation may increase security of network device 210 and/or permit recovery of network device 210 in situations of potential tampering, theft, error and/or the like related to network device 210.

In some implementations, when network device 210 determines to boot up in the particular mode of operation, network device 210 may permit a user of network device 210 to input a code, a security token, a username and password combination, and/or the like to abort boot up in the particular mode of operation. For example, the deployment of network device 210 may have been permissibly modified and the user of network device 210 may want to prevent network device 210 from booting up in a recovery-type mode. In this case, inputting a code, a security token, and/or the like may prevent network device 210 from booting up in the recovery-type mode. Additionally, or alternatively, the user may use the same code, security token, and/or the like to rewrite the set of parameters that define the deployment of network device 210, so as to prevent future boot up in the particular mode of operation while network device 210 has the current deployment and to cause network device 210 to boot up normally. This conserves processing resources that would have been erroneously used to boot up network device 210 in the particular mode of operation.

In this way, network device 210 may determine whether to boot up network device 210 in a particular mode of operation based on a result of the comparison.

As further shown in FIG. 4, process 400 may include performing an action based on determining whether to boot up the network device in the particular mode of operation (block 450). For example, network device 210 may perform an action based on determining whether to boot up network device 210 in the particular mode of operation. In some implementations, network device 210 may boot up in the particular mode of operation, when the boot up identifier and the provisioned identifier do not match, or may boot up normally, when the boot up identifier and the provisioned identifier match.

In some implementations, the action may permit recovery (e.g., physical or technical) of network device 210. For example, the action may include providing the boot up identifier and/or the provisioned identifier to server device 220 (e.g., a log server), client device 230, and/or the like. Additionally, or alternatively, and as another example, network device 210 may prevent software and/or an application from booting up. Additionally, or alternatively, and as another example, network device 210 may restrict access to network device 210 (e.g., to an administrator, to root access, via a console of network device 210, via SSH, etc.). Additionally, or alternatively, and as another example, network device 210 may provide information related to the deployment of network device 210 to server device 220 and/or client device 230 (e.g., a GPS location to permit physical recovery of network device 210, an IP address to permit identification of network device 210 on network 240, etc.).

Additionally, or alternatively, and as another example, network device 210 may trigger an alarm. Additionally, or alternatively, and as another example, network device 210 may uninstall software or an application (e.g., unpermitted or unlicensed software). Additionally, or alternatively, and as another example, network device 210 may obtain software (e.g., to configure network device 210 according to an intended deployment). In this way, network device 210 may restrict operation of network device 210, permit and/or facilitate recovery of network device 210, permit and/or facilitate fixing of an error related to network device 210, and/or the like, thereby improving security of network device 210 and/or facilitating fixing of network device 210. In some implementations, network device 210 may re-connect to network 240 upon recovery and/or reconfiguration.

In some implementations, network device 210 may generate a set of instructions for recovering network device 210 (e.g., based on a boot up identifier, based on a difference between a boot up identifier and a provisioned identifier, etc.). For example, network device 210 may generate a set of instructions related to reconfiguring software and/or an application of network device 210 to return network device 210 to an intended deployment and to facilitate a technical recovery of network device 210. Additionally, or alternatively, and as another example, network device 210 may generate a set of directions to a physical location of network device 210 to facilitate a physical recovery of network device 210. This improves recovery of network device 210 relative to not generating a set of instructions, by increasing an efficiency of recovering network device 210.

In this way, network device 210 may perform an action based on determining whether to boot up network device 210 in the particular mode of operation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
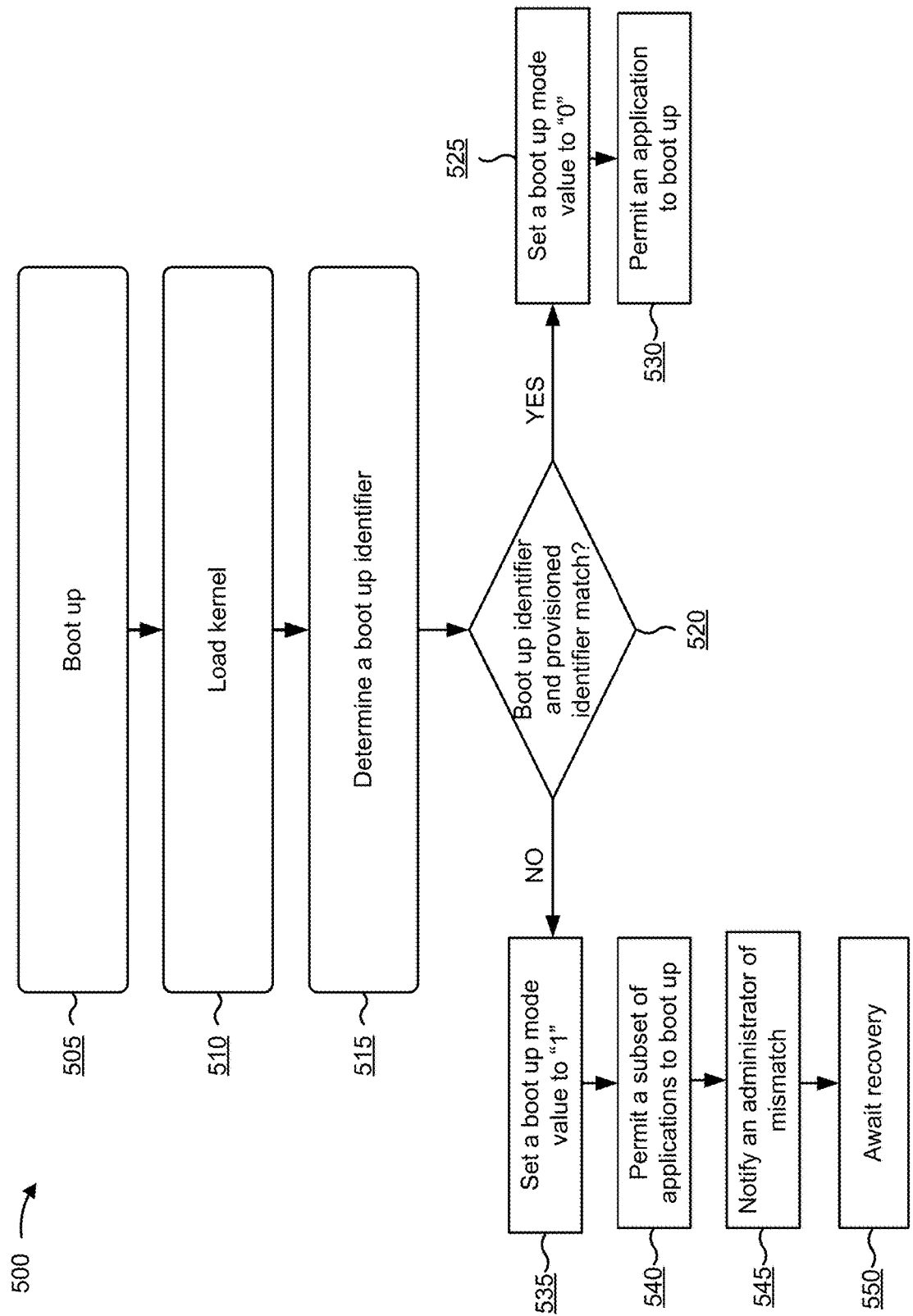
FIG. 5 is a diagram of an example implementation relating to the example process shown in FIG. 4.

FIG. 5 is a diagram of an example implementation 500 relating to example process 400 shown in FIG. 4. FIG. 5 shows an example of guarded mode boot up and/or recovery of a network device.

As shown in FIG. 5, and by reference number 505, network device 210 may boot up. For example, network device 210 may boot up after receiving an indication to boot up. As shown by reference number 510, network device 210 may load a kernel of network device 210. For example, network device 210 may load a core computer program associated with an operating system of network device 210. As shown by reference number 515, network device 210 may determine a boot up identifier in a manner similar to that described above. In some implementations, network device 210 may determine the boot up identifier after loading a kernel and prior to loading an application or software associated with network device 210. This improves security of network device 210 by preventing an application or software that is not associated with an intended deployment of network device 210 from loading.

As shown by reference number 520, network device 210 may determine whether the boot up identifier and a provisioned identifier match. For example, network device 210 may determine whether the boot up identifier and the provisioned identifier have the same value, whether a difference between a value of the boot up identifier and a value of the provisioned identifier satisfies a threshold, and/or the like.

As shown by reference number 525, if network device 210 determines that the boot up identifier and the provisioned identifier match, then network device 210 may set a boot up mode value to zero (e.g., "0") (reference number 520-YES). For example, the boot up mode value may indicate whether network device 210 is to boot up in particular mode of operation that permits recovery and/or facilitates fixing of network device 210. In this case, the value of zero may indicate that network device 210 is not to boot up in the particular mode of operation. As shown by reference number 530, network device 210 may permit an application to boot up. For example, network device 210 may boot up normally.

As shown by reference number 535, if network device 210 determines that the boot up identifier and the provisioned identifier do not match, then network device 210 may set a boot up mode value to "1," thereby indicating that network device 210 is to boot up in the particular mode of operation (reference number 520-NO). As shown by reference number 540, network device 210 may permit a subset of applications installed on network device 210 to boot up. For example, network device 210 may boot up applications that permit recovery of network device 210 and/or facilitate fixing of an error related to network device 210. As shown by reference number 545, network device 210 may notify an administrator of the mismatch between the boot up identifier and the provisioned identifier. For example, network device 210 may send a message to server device 220 and/or client device 230 that indicates the mismatch. As shown by reference number 550, network device 210 may await recovery (e.g., prior to booting up other applications). For example, network device 210 may wait to be reconfigured according to an intended deployment, to be moved to an intended location, and/or the like.

As indicated above, FIG. 5 is provided merely as an example. Other examples are possible and may differ from what was described with regard to FIG. 5. Although implementations are described herein in the context of network device 210, the implementations apply equally to other types of devices, such as server device 220 and/or client device 230.

Some implementations, described herein, provide a network device that is capable of receiving an indication to boot up, determining a boot up identifier that identifies a deployment of the network device, performing a comparison of the boot up identifier and a provisioned identifier that identifies an intended deployment of the network device, determining whether to boot up the network device in a particular mode of operation that permits reconfiguration and/or recovery of the network device based on a result of the comparison, and/or performing an action based on determining whether to boot up the network device in the particular mode of operation.

In this way, a network device may quickly and accurately determine whether a network device has experienced an error, has been configured to operate in an unpermitted manner, has been physically moved to an unpermitted location, and/or the like. In addition, the network device may facilitate physical and/or technical recovery of the device. This increases technical security of the network device, thereby increasing operational integrity of the network device. In addition, this increases physical security of the network device, thereby reducing or eliminating physical loss associated with the network device.

Although some implementations described herein are described with reference to physical components and/or devices, the physical components and/or devices can be virtualized and executed on one or more virtual machines implemented on one or more computing devices, such as one or more computing devices operating in a cloud computing environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories, and
one or more processors, implemented at least partially in hardware, communicatively coupled to the one or more memories, to:
  receive an indication to boot up;
  determine a first identifier for the device using information related to a deployment of the device,
    the first identifier comprising a boot up identifier identifying the deployment of the device, and
    the information related to the deployment of the device including information identifying at least one of a wireless spectrum which the device is configured to use or a physical location of the device in a rack or shelf;
  perform a comparison, based at least in part on the wireless spectrum which the device is configured to use, of the first identifier and a second identifier to determine whether the deployment of the device matches an intended deployment associated with the device,
    the second identifier comprising a provisioned identifier identifying the intended deployment associated with the device;
  determine whether to boot up the device in a particular mode of operation based on a result of the comparison,
    the particular mode of operation permitting reconfiguration or recovery of the device; and
  perform an action based on determining whether to boot up the device in the particular mode of operation.

2. The device of claim 1, where the one or more processors are further to:
determine whether the first identifier and the second identifier match; and
where the one or more processors, when determining whether to boot up the device in the particular mode of operation, are to:
  determine whether to boot up the device in the particular mode of operation based on whether the first identifier and the second identifier match.

3. The device of claim 1, where the one or more processors are further to:
obtain the second identifier from another device; and
where the one or more processors, when performing the comparison, are to:
  perform the comparison after obtaining the second identifier.

4. The device of claim 1, where the one or more processors are further to:
receive the information related to the deployment of the device; and
where the one or more processors, when determining the first identifier, are to:
  determine the first identifier using the information related to the deployment of the device.

5. The device of claim 1, where the one or more processors, when performing the action, are to:

provide, to another device, a set of directions to a physical location of the device to permit physical recovery of the device.

6. The device of claim 1, where the one or more processors, when performing the action, are to:
boot up the device in the particular mode of operation; and
provide a message to an administrator that the device has booted up in the particular mode of operation.

7. A non-transitory computer-readable medium storing instructions, the instructions comprising:
one or more instructions that, when executed by one or more processors, cause the one or more processors to:
receive an indication to boot up;
determine a first set of parameters that define a first deployment for a device;
determine a first identifier for the device using information related to the first deployment of the device after receiving the indication to boot up,
the first identifier comprising a boot up identifier identifying the first deployment of the device,
the information identifying a first set of values for the first set of parameters that define the first deployment, and
the information related to the first deployment of the device including information identifying a slot or a shelf of a rack in which the device is located;
perform a comparison of the first identifier and a second identifier to determine whether the first deployment of the device and a second deployment associated with the device match,
the second identifier identifying the second deployment associated with the device, where the second deployment is an intended deployment,
the second identifier being based on a second set of values for a second set of parameters that define the second deployment;
determine whether to boot up the device in a mode of operation based on a result of the comparison,
the mode of operation permitting reconfiguration or recovery of the device; and
perform an action based on determining whether to boot up the device in the mode of operation.

8. The non-transitory computer-readable medium of claim 7, where the one or more instructions, when executed by the one or more processors, further cause the one or more processors to:
determine whether a difference between the first identifier and the second identifier satisfies a threshold; and
where the one or more instructions, that cause the one or more processors to determine whether to boot up the device in the mode of operation, cause the one or more processors to:
determine whether to boot up the device in the mode of operation based on determining whether the difference between the first identifier and the second identifier satisfies the threshold.

9. The non-transitory computer-readable medium of claim 7, where the one or more instructions, that cause the one or more processors to determine the first identifier, further cause the one or more processors to:
combine the first set of values for the first set of parameters to form the first identifier.

10. The non-transitory computer-readable medium of claim 7, where the one or more instructions, when executed by the one or more processors, further cause the one or more processors to:
load a kernel of the device; and
where the one or more instructions, that cause the one or more processors to determine the first identifier, cause the one or more processors to:
determine the first identifier after loading the kernel and prior to loading an application associated with the device.

11. The non-transitory computer-readable medium of claim 10, where the one or more instructions, that cause the one or more processors to perform the action, cause the one or more processors to:
selectively:
load the application based on the result indicating that the first identifier and the second identifier match, or
load a subset of the application based on the result indicating that the first identifier and the second identifier do not match.

12. The non-transitory computer-readable medium of claim 7, where the one or more instructions, that cause the one or more processors to perform the action, cause the one or more processors to:
provide the first identifier or the second identifier to another device to permit technical recovery of the device.

13. The non-transitory computer-readable medium of claim 7, where the one or more instructions, that cause the one or more processors to perform the action, cause the one or more processors to:
obtain first software for the device,
install the first software on the device, or
uninstall second software installed on the device.

14. A method, comprising:
determining, by a device, a boot up identifier for the device using information related to a deployment of the device,
the boot up identifier identifying the deployment of the device, and
the information related to the deployment of the device including information identifying at least one of a wireless spectrum which the device is configured to use or a physical location of the device in a rack or shelf;
performing, by the device and based on the information related to the deployment of the device, a comparison of the boot up identifier and a provisioned identifier to determine whether the deployment of the device and an intended deployment of the device match,
the provisioned identifier identifying the intended deployment of the device; and
performing, by the device, a boot up of the device in a particular mode of operation based on a result of the comparison,
the comparison indicating whether the deployment of the device and the intended deployment of the device match,
the particular mode of operation to cause the device to boot up to recover or reconfigure the device.

15. The method of claim 14, where determining the boot up identifier comprises:
determining the boot up identifier using an algorithm to process a set of third identifiers associated with a set of parameters that define the deployment of the device.

16. The method of claim 14, where the particular mode of operation permits a network administrator to perform a physical recovery of the device or to perform a technical recovery of the device.

17. The method of claim 14, further comprising:
  determining to perform the boot up of the device in the particular mode of operation based on the comparison indicating that the deployment of the device and the intended deployment of the device do not match, or
  determining not to perform the boot up of the device in the particular mode of operation based on the comparison indicating that the deployment of the device and the intended deployment of the device match.

18. The method of claim 14, where performing the boot up comprises:
  preventing an application or software associated with the device from loading based on determining whether the deployment of the device and the intended deployment of the device match.

19. The method of claim 14, further comprising:
  restricting access to the device to a particular type of access that includes:
    administrator access,
    root access,
    access via a console of the device, or
    access via secure shell (SSH).

20. The method of claim 14, further comprising:
  determining, based at least in part on a result of the comparison, at least one of:
    whether the device has experienced tampering,
    whether the device has been configured to operate in an unpermitted manner,
    whether the device has been moved to an unpermitted location, or
    whether the device has experienced an error during boot up.

* * * * *